: US 8,600,604 B2
(45) Date of Patent: Dec. 3, 2013

(12) United States Patent
Basir et al.

(54) DATA INTEGRITY VERIFICATION DEVICE

(75) Inventors: Otman Adam Basir, Waterloo (CA); David Bullock, Waterloo (CA)

(73) Assignee: Intelligent Mechatronic Systems Inc., Waterloo, Ontario (CA)

(*) Notice: Subject to any disclaimer, the term of this patent is extended or adjusted under 35 U.S.C. 154(b) by 1850 days.

(21) Appl. No.: 11/046,523

(22) Filed: Jan. 28, 2005

(65) Prior Publication Data
US 2005/0171650 A1 Aug. 4, 2005

Related U.S. Application Data

(60) Provisional application No. 60/540,165, filed on Jan. 29, 2004.

(51) Int. Cl.
G01M 17/00 (2006.01)

(52) U.S. Cl.
USPC .......... 701/29.1; 701/29.2; 701/29.6; 701/39; 340/870.02; 340/870.16; 340/637; 340/427; 340/527

(58) Field of Classification Search
USPC ............................ 340/425; 701/35
See application file for complete search history.

(56) References Cited

U.S. PATENT DOCUMENTS

| | | | |
|---|---|---|---|
| 5,559,484 A | 9/1996 | Nowicki et al. | |
| 5,797,134 A | 8/1998 | McMillan et al. | |
| 6,040,763 A * | 3/2000 | Nakajima | 340/427 |
| 6,064,970 A | 5/2000 | McMillan et al. | |
| 6,195,763 B1 | 2/2001 | Mayer et al. | |
| 6,232,886 B1 * | 5/2001 | Morand | 340/870.02 |
| 6,438,742 B1 | 8/2002 | McCann et al. | |
| 6,466,134 B1 * | 10/2002 | Ahearn | 340/683 |
| 6,868,386 B1 | 3/2005 | Henderson et al. | |
| 2002/0027502 A1 * | 3/2002 | Mayor | 340/431 |
| 2003/0055552 A1 | 3/2003 | Akins et al. | |
| 2004/0153362 A1 | 8/2004 | Bauer et al. | |

FOREIGN PATENT DOCUMENTS

| | | | |
|---|---|---|---|
| EP | 1 118 965 | 7/2001 | |
| JP | 2000-088680 | * 3/2000 | G01L 5/00 |
| WO | WO 96/10807 | * 4/1996 | G07C 5/00 |
| WO | WO 02/089084 | 11/2002 | |

OTHER PUBLICATIONS

T.Wenzel, Analysis of National Pay-As-You-Drive Insurance Systems and Other Variable Driving Charges, Lawrence Berkeley Laboratory, Jul. 1995, University of California.
Supplementary European Search Report dated Sep. 10, 2009 for EP05706441.

* cited by examiner

*Primary Examiner* — Redhwan K Mawari
(74) *Attorney, Agent, or Firm* — Carlson, Gaskey & Olds P.C.

(57) ABSTRACT

This invention is a system and process for determining and verifying the voracity of data gathered for use in recording and tracking vehicle usage. The device operates to verify and detect events that may affect data integrity by sensing a condition indicative of faulty data acquisition or of corruption of data integrity. Data evidencing potential problems are encoded and included with normal data uploaded to a central server. The central server compares the encoded entries against criteria that have been determined to indicate potential data inconsistencies.

18 Claims, 3 Drawing Sheets ively disconnected from the vehicle 12, a disconnection will be registered by the device 14 and data indicative of such disconnection will be encoded and transmitted with other data to the central server 22.

DATA INTEGRITY VERIFICATION DEVICE

The application claims priority to U.S. Provisional Application No. 60/540,165 which was filed on Jan. 29, 2004.

BACKGROUND OF THE INVENTION

This invention generally relates to a device and method for verifying the integrity of data obtained, stored and transmitted from a data acquisition device. More particularly, this invention relates to a device for analyzing data to verify data voracity.

Data is obtained and stored for many different reasons and to provide a wide range of information. Data is often gathered in a raw form for subsequent recompilation and formulation. The interim period between gathering and recompilation may be susceptible to degradation and introduction of unauthorized alteration. Modification, or malfunction of sensors or memory devices can cause desired data to develop or record errant information that may lead to faulty determinations or decisions.

Further, knowledge of system operation may avail a less scrupulous user to attempt modification of the actual acquisition of data to provide favorable but inaccurate results. In such cases, although the system is gathering data as planned and designed, the data is simply not an accurate representation of actual operation of the vehicle.

Accordingly, it is desirable to develop and design a device and method for verifying the integrity of data acquisition to assure the accuracy and voracity of data.

SUMMARY OF THE INVENTION

This invention is a system and process for determining and verifying the voracity of data gathered for use in recording and tracking vehicle usage.

The acquisition and storage of data is valuable only if the voracity and accuracy of that information is verifiable. Without an adequate method and indicator of data authenticity, such data is of limited value. The device operates to verify and detect events that may affect data integrity by sensing conditions indicative of faulty data acquisition.

An example condition includes the absence of external power to the device. If it is determined that main power is off, the device switches to a back up power mode to provide power to critical systems including a vibration sensor. In instances where the device is improperly disconnected from the vehicle power supply, the vibration sensor will register movement. Movement of the device in the absence of vehicle power provides a strong indicator that a purposeful disconnection of the device has been made. This is in contrast to instances, such as when a vehicle battery is replaced or disconnected during service. Data related to the movement and usage during the power off condition is encoded and included with data uploaded to a central server.

The central server compares the encoded entries against criteria that have been determined to indicate potential data inconsistencies. Such conditions may include patterns of repeating data for a single vehicle, or identical data for more than one vehicle.

Accordingly, the device of this invention provides several methods and indicators of unauthorized modification of data both with sensors that detect physical abnormalities and by analysis of gathered data. The device thereby provides for verification of data for use in a vehicle usage monitoring system.

These and other features of the present invention can be best understood from the following specification and drawings, the following of which is a brief description.

DETAILED DESCRIPTION OF THE PREFERRED EMBODIMENT

Figure 1:
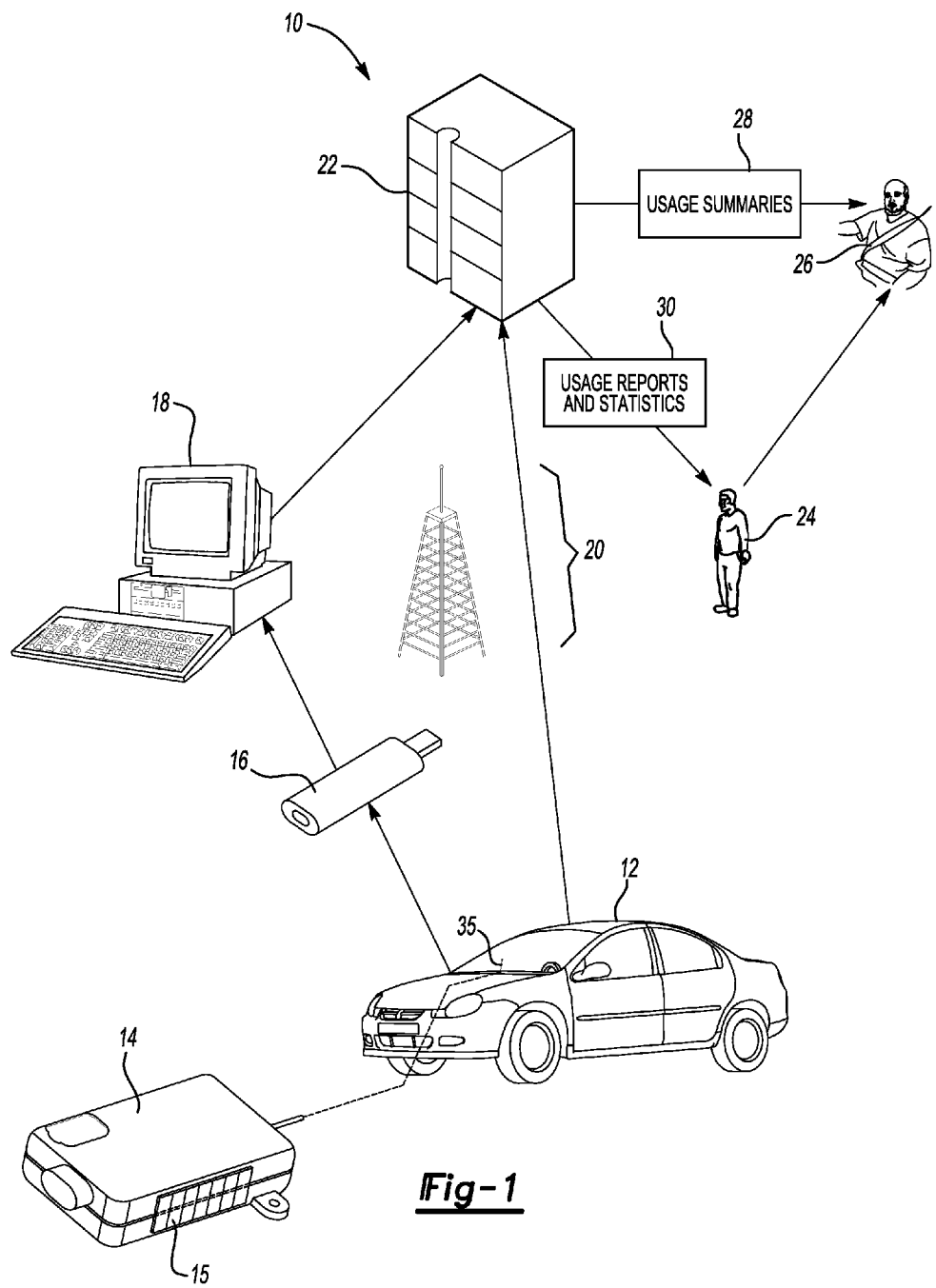
FIG. 1 is a block diagram illustrating an example system and process for the process of gathering and compiling vehicle usage data according to this invention.

Referring to FIG. 1, a schematic representation of a system 10 is shown and includes a device 14 for installation within a vehicle 12. The device 14 is installed within the vehicle 12 preferably in a location that is easily accessible yet not in plain view such as to cause an obstruction to the operator. Preferably, the device 14 will be installed underneath an instrument panel or within a glove compartment. The device 14 is attached and connected to receive power from a vehicle power source. Power from the vehicle can originate from a fuse box or other powered connection within the vehicle 12 as known.

A memory device 16 provides for the extraction of data gathered and stored within the device 14. The memory device 16 illustrated is a USB data key 16 that is insertable and removable from the module 14. The USB data key 16 receives information that is compiled from the device 14 for subsequent analysis. In the example embodiment, the USB data key 16 is removed and communicates with a personal computer 18. The vehicle user removes the USB data key 16 in response to a triggering event such as a lapse of time and downloads the information into the personal computer 18. The information is then transmitted via the Internet or other data communication link to a central server 22. The central server 22 interprets the information and generates a summary 28 and usage reports 30. The summary 28 may be reviewed by an operator 26 and can contain any desired combination of information gathered by the device 14.

FIG. 1 shows another example transmission method where the device 14 directly transmits by way of a wireless link 20 to the central server 22. This provides for the automatic transmission of data indicative of vehicle usage directly to the central server 22 without requiring operator intervention or action. Such a wireless transmission link streamlines data acquisition and processing at the central server 22. Further, automatic and direct transmission of vehicle usage information can substantially eliminate potential data integrity and verification issues that may arise with the involvement of the operator 26.

Figure 2:
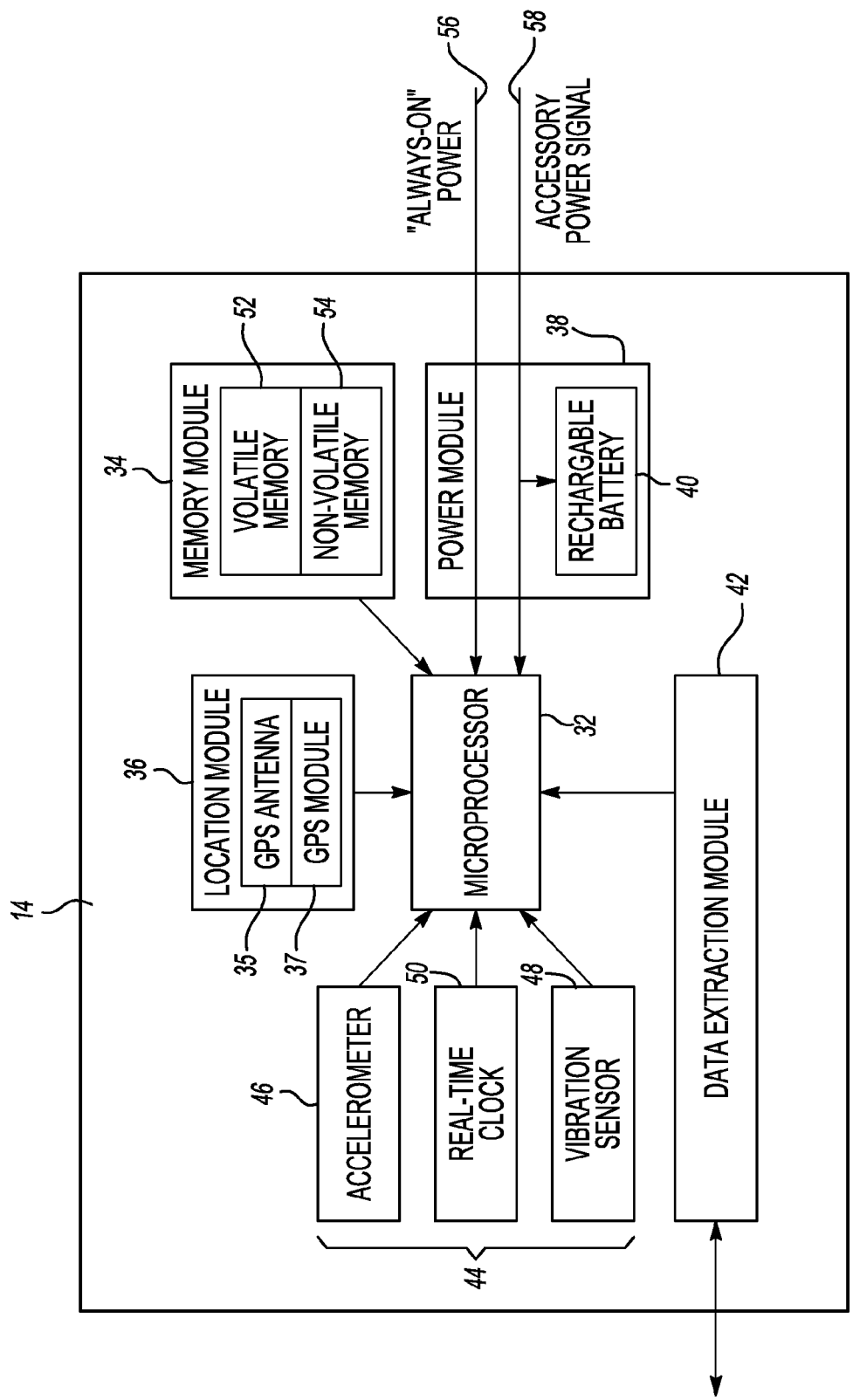
FIG. 2 is a block diagram of and example module according to this invention.

Referring to FIG. 2, the device 14 includes a power module 38 including a connection to an external power source, and an internal power source 40 for powering the device 14 independent of the external power source. The internal power source 40 is a rechargeable battery. Although a rechargeable battery is shown, standard commercially available batteries may also be used dependent on application specific requirements.

The power module 38 receives an always-on signal 56 and an accessory power signal 58 from the vehicle 12. The always-on signal 56 provides an indication that the device 14 is properly integrated and connected to the vehicle 12 for receiving information indicative of vehicle usage. The accessory signal 58 provides an indication as to the actual operating state of the vehicle 12. For example, is the vehicle 12 in a parked and off condition, or is the vehicle running and being driven.

A sensor module 44 includes an accelerometer 46 for determining an acceleration of deceleration of the vehicle 12. The accelerometer is preferably capable of measuring acceleration in three axes, however, any accelerometer known in the art is within the contemplation of this invention. Measuring acceleration provides a good indication of driving habits of the operator 26. Frequent hard braking and hard acceleration can be indicators of operator driving habits. Further, hard cornering is also detected by the accelerometer 46 and provides information indicative of an operator's driving habits.

A real time clock 50 provides the time for several purposes including providing a determination of the time of day in which the vehicle is operating. The clock 50 allows the determination of trends of vehicle usage. Further, the clock 50 is utilized to determined the amount of time the vehicle is used, per-day and over the enter data acquisition period.

A vibration sensor 48 provides an indication as to whether the vehicle is moving or not in the absence of power from the vehicle itself. The vibration sensor 48 is powered by the power module 38. When the power module 38 is receiving power from the vehicle power source, so does the vibration sensor 48. In the absence of external power, the vibration sensor 48 can be operated by the rechargeable batteries 40.

A localization module 36 includes an antenna 35 and a global positioning system module 37. The antenna 35 receives signals from satellites to determine a location of the device 14, and thereby the vehicle with regard to a specific longitude and latitude. The position information provides for the determination of the places in which the vehicle is being utilized. Positional information provides for the determination of several valuable types of information including time within a specific geographic region in which a vehicle is operating. Further, the location module provides information that is utilized to determine how much time a vehicle is used within a specific defined region such as a postal code, city or town limit. Additionally, further, the system may even provide information as to the type of road the vehicle is used on, for example surface streets or on an expressway.

A memory module 34 is disposed within the device 14 for storing data indicative of vehicle usage. The memory module 34 includes a volatile memory 52 and a non-volatile memory 54 as are commonly known. The memory module 34 provides for the temporary storage of data acquired from the vehicle 12.

A microprocessor 32 communicates and controls the device 14 and provides for receiving and storage of data as desired from the vehicle 12. The microprocessor 32 is shown schematically and may be of any common commercially available configuration. A worker skilled in the art would be able to program the microprocessor 32 as required to perform the functions of gathering and interrogating data. The microprocessor 32 is programmed to collect data from internal and external sensors and to store that data in the memory module 34.

The data received indicative of vehicle usage comprises a large volume of raw data. The raw data can be stored in the memory module 34 without processing or may be processed according to desired criteria to isolate only that data desired. Data stored in the memory module 34 remains for a desired time and then is transmitted via a data extraction module 42 to the central server 22 for processing. The data extraction module 42 may comprise a removable memory storage device such as the data key 16 or other known removable memory devices. Further the data extraction module 42 may comprise a transmitter for transmitting data via a wireless link to a central server 22. It is within the contemplation of this invention that the transmission and extraction of data may be accomplished according to various methods known by those skilled in the art such as for example, infrared transmission, Bluetooth, wireless-USB and an 802.11b. connection.

The acquisition and storage of data is valuable only if the voracity and accuracy of that information is verifiable. Without an adequate method and indicator of data authenticity, such data is of limited value. The example device 14 of this invention receives and records data indicative of vehicle usage and provides the data for use in verifying and determining various performance-based parameters. Unreliable or corruptible data acquisition may inhibit the use of the device 14. Accordingly, the device 14 includes several features for verifying data integrity and for detecting events that are indicators that data has been gathered improperly.

The device 14 itself includes physical indicators 15 (FIG. 1) of unauthorized access such as non-removable stickers over access openings that once broken are non-repairable. Therefore any unauthorized access to internal portions of the device is clearly shown and cannot be falsified. Other physical indicators can include seals applied over seams to evidence disassembly of the device by unauthorized persons.

Physical intrusion of the device 14 is only one instance that is protected against. In many instances data gathering can be manipulated without access to the internal workings of the device 14. In some instances, an attempt may be made to turn off the device 14 by disconnecting external power, thereby preventing gathering of data in locations or times that are unfavorable. The device 14 includes sensors that operate to detect such occurrences.

Figure 3:
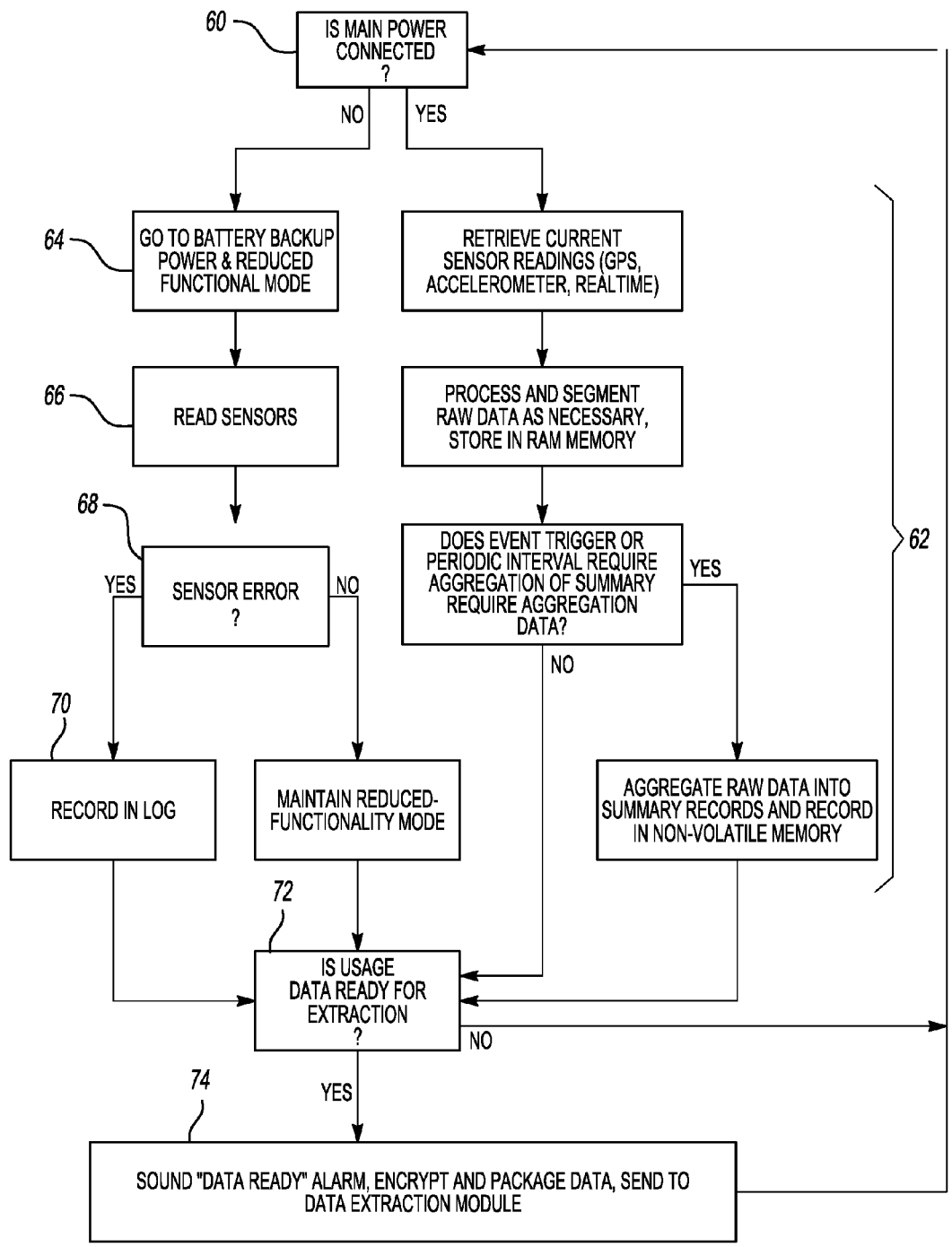
FIG. 3 is a block diagram of an example process for assuring data voracity according to this invention.

Referring to FIG. 3, the device 14 operates to verify and detect events that may affect data integrity by sensing a condition indicative of faulty data acquisition or of corruption of data integrity. One example of a sensed condition is the absence of external power to the device 14. The process begins by determining if main power is connected as indicated at 60. If main power is connected the device 14 gathers data normally and proceeds to process and segment the raw data in preparation for extraction and evaluation by the central server 22. These steps are the normal operation and are indicated by process steps indicated at 62.

However, if it is determined that main power is off, the device 14 switches to a back up power mode indicated at 64 to power critical systems along with the vibration sensor 48. In instances were the device 14 is improperly disconnected from the vehicle power supply, the vibration sensor 48 will register movement. Movement of the device 14 in the absence of vehicle power is a strong indicator that a purposeful disconnection of the device 14 has been made. This is in contrast to instances, such as when a vehicle battery is replaced or disconnected during service. In such instances, the vehicle 12 would be substantially stationary.

Accordingly, upon initiation of the back up power system the vibration sensor 48 is activated as indicated at 64 and data gathered indicative of movement of the device 14 as indicated at 66 and thereby the vehicle 12. The data is interrogated by the microprocessor 32 according to a predetermined algorithm as indicated at 68. The results of the interrogation of data by the microprocessor are encoded and an entry made to an error log in the memory module 34 as indicated at 70. The encoded entry prevents viewing of data gathered that evidences improper use or disconnection of the device 14. The encoded entries remain in the memory module 34 until such time as the data from the device 14 is transmitted to the central processing server 22.

The central processing server 22 compares the encoded entries against predetermined criteria. The predetermined criteria include instances and events that in combination indicate operation of the device 14 improperly. Such instances include but are not limited to movement that occurs substantially concurrently with the off power condition. As appreciated, a power off condition accompanied by vehicle movement indicates that the vehicle was being operated substantially normally, and not in the process of being serviced. Accordingly, the duration of time that the vehicle was moving without gathering data can be compared to the actual data gathered and a decision can be made based on that information whether or not to accept that data as being accurate.

The device of this invention can also include a sensor for sensing entry to unauthorized portions of the device 14. Such a sensor provides a signal to the controller in the event that the device is opened. The signal is processed by the microprocessor to generate an encoded entry that is stored in the memory module 34.

Data from the device 14 is sent to the central server 22 according to a desired criteria or event. The event may include a specific triggering event, such as change of location, or exceeding a certain speed. Further the event may also be the elapse of a specific duration of time, such as for example transmission of data every 4 months.

Data transmitted is encoded and packaged for receipt by the central server 22. The central server 22 decodes the data and formulates the information according to a predetermined format. The specific type of format can be of any known type including for example a comparison to other data, or between specific data and sensor combination as may be required or useful.

The central server 22 also analyzes data gathered by the device 14 for patterns indicative of faulty data acquisition. In some instances, physical modification, or triggering events may not be evident. However, data may have been corrupted in other ways. Accordingly, the central server 22 analyses the data for patterns that are evidence of unusual circumstances that result from efforts to corrupt or improperly modify vehicle usage data.

The data may include repeating patterns that indicate something incorrect about the vehicle usage data. The data may also include repeating patterns of vehicle usage that were submitted for different vehicles. The data may also include a mis-match between the device 14 and a specific vehicle 12. The analysis of the data is performed at a location remote from the device 14 to prevent undesirable modification and detection of the encoded entries.

The device 14 of this invention provides several methods and indicators of unauthorized modification of data both with sensors that detect physical abnormalities and by analysis of gathered data. The device accordingly provides for the verification of data for use in a vehicle usage monitoring system.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of verifying data integrity comprising the steps of:
   a) sensing a condition indicative of faulty data acquisition integrity collected by a device, wherein at least one of the sensed conditions includes detecting an absence of power from a main power source to the device;
   b) obtaining data indicative of movement of the device during the detected absence of main power by powering at least one sensing device powered by a back-up power source disposed within the device;
   c) storing data indicative of the sensed condition as an encoded entry;
   d) forwarding the encoded entry with other acquired data to a central processor;
   e) evaluating the encoded entry against predetermined criteria; and
   f) indicating that data integrity has been compromised responsive to a failure of the encoded entry to fall within the predetermined criteria.

2. The method as recited in claim 1, comprising detecting movement with a vibration sensor.

3. The method as recited in claim 2, comprising indicating a possibility of data integrity fault responsive to data indicative of movement occurring concurrently with the detected off power condition.

4. The method as recited in claim 1, where step a) comprises sensing entry to unauthorized portions of a device.

5. The method as recited in claim 1, where step a) comprises sensing movement of a data acquisition device.

6. The method as recited in claim 1, where the device is installed in a motor vehicle and collects data indicative of vehicle usage.

7. The method as recited in claim 6, where the device includes a back up power system for powering the device during in the absence of power from a main power source provided by the motor vehicle.

8. The method as recited in claim 1, where step a) comprises analyzing data gathered by the device for patterns indicative of faulty data acquisition.

9. The method as recited in claim 8, where the pattern indicative of faulty data acquisition includes an identical repeating pattern of vehicle usage.

10. The method as recited in claim 9, where the pattern indicative of faulty data acquisition includes repeating patterns of vehicle usage for different vehicles.

11. The method as recited in claim 9, where the pattern indicative of faulty data acquisition includes detecting a mis-match between data stored within the device and a specific vehicle usage.

12. The method as recited in claim 1, where step d) is performed at a location remote from the data acquisition device.

13. A device for acquiring data indicative of vehicle usage comprising:
    a power module including a connection to an external power source, and an internal power source for powering said device independent of the external power source;
    a first sensor for detecting motion of said device;
    a data storage medium for storing data indicative of vehicle usage; and
    a controller programmed to collect data from said first sensor responsive to the power module not receiving power from the external power source.

14. The device as recited in claim 13, where said controller encodes data for analysis by an authorized user and stores said encoded data in said data storage medium.

15. The device as recited in claim 14, where said encoded data is transmitted to a central server for analysis.

16. The device as recited in claim 14, where said first sensor comprises a vibration sensor disposed within said device and powered by said internal power source when the power module is not receiving power from the external power source.

17. The device as recited in claim 14 including a second sensor for indicating unauthorized access to a restricted portion of said device.

18. The device as recited in claim 14, including a physical indicator of unauthorized access to said device.

\* \* \* \* \*